US009618644B2

(12) United States Patent
Tong et al.

(10) Patent No.: US 9,618,644 B2
(45) Date of Patent: Apr. 11, 2017

(54) SENSING CABLE WITH PARALLEL SPIRAL TRANSMISSION LINE STRUCTURE FOR DISTRIBUTED SENSING AND MEASURING OF ROCK-SOIL MASS DEFORMATION

(71) Applicant: China Jiliang University, Hangzhou (CN)

(72) Inventors: Renyuan Tong, Hangzhou (CN); Qing Li, Hangzhou (CN); Ming Li, Hangzhou (CN); Xiong Li, Hangzhou (CN); Ge Shi, Hangzhou (CN)

(73) Assignee: CHINA JILIANG UNIVERSITY, Hangzhou, Zhejiang (CN)

( * ) Notice: Subject to any disclaimer, the term of this patent is extended or adjusted under 35 U.S.C. 154(b) by 61 days.

(21) Appl. No.: 14/358,441

(22) PCT Filed: Nov. 13, 2012

(86) PCT No.: PCT/CN2012/084551
§ 371 (c)(1),
(2) Date: May 15, 2014

(87) PCT Pub. No.: WO2013/071855
PCT Pub. Date: May 23, 2013

(65) Prior Publication Data
US 2014/0312907 A1 Oct. 23, 2014

(30) Foreign Application Priority Data
Nov. 15, 2011 (CN) .......................... 2011 1 0361043

(51) Int. Cl.
*G01V 3/00* (2006.01)
*G01V 3/08* (2006.01)
(Continued)

(52) U.S. Cl.
CPC ................ *G01V 3/00* (2013.01); *G01L 5/101* (2013.01); *G01V 1/008* (2013.01); *G01V 3/082* (2013.01)

(58) Field of Classification Search
CPC ........... G01V 3/00; G01V 3/082; G01V 1/008
(Continued)

(56) References Cited

U.S. PATENT DOCUMENTS 3,824,503 A * 7/1974 McCracken .................... 333/26
4,877,923 A * 10/1989 Sahakian .................... 174/11 R
(Continued)

FOREIGN PATENT DOCUMENTS

CN 102109319 * 6/2011

*Primary Examiner* — Reena Aurora
(74) *Attorney, Agent, or Firm* — Han IP Corporation; Andy M. Han

(57) ABSTRACT

This present disclosure provides a sensing cable of parallel spiral transmission line structure for distributed sensing and measuring of rock-soil mass deformation. A circular cross-section of a silicone strip is tightly wounded by two mutually-insulated wires. The two mutually-insulated wires form the spiral cable. The two mutually-insulated wires are wrapped around and covered by a silicone shroud. They constitute a sensing cable. A termination matching impedance is connected to one end of each of the two mutually-insulated wires. A time domain reflectometry measurement instrument is connected to the other end of the two mutually-insulated wires. The present disclosure implements a distributed positioning and measurement of rock-soil mass deformation.

17 Claims, 2 Drawing Sheets

(51) Int. Cl.
*G01V 1/00* (2006.01)
*G01L 5/10* (2006.01)

(58) Field of Classification Search
USPC .......................................... 324/348
See application file for complete search history.

(56) References Cited

U.S. PATENT DOCUMENTS

| | | | | |
|---|---|---|---|---|
| 5,818,241 | A * | 10/1998 | Kelly | 324/640 |
| 5,916,940 | A * | 6/1999 | Hirai | C08K 3/36 |
| | | | | 524/301 |
| 8,969,724 | B2 * | 3/2015 | Tatsumi | H01B 7/06 |
| | | | | 174/110 R |
| 2011/0088925 | A1 * | 4/2011 | Tatsumi et al. | 174/69 |

* cited by examiner (a)          (b)

SENSING CABLE WITH PARALLEL SPIRAL TRANSMISSION LINE STRUCTURE FOR DISTRIBUTED SENSING AND MEASURING OF ROCK-SOIL MASS DEFORMATION

CROSS-REFERENCE TO RELATED APPLICATION

This application is the national phase application of International application number PCT/CN2012/084551, filed Nov. 13, 2012, which claims the priority benefit of China Patent Application No. 201110361043.9, filed Nov. 15, 2011. The above-identified applications are hereby incorporated by reference in their entirety.

TECHNICAL FIELD

The present disclosure relates to a rock deformation distributed sensing cable and, more particularly, to a sensing cable with parallel spiral transmission line structure for distributed sensing and measuring of rock-soil mass deformation.

BACKGROUND

China is a country with frequent geological disasters which lead to great loss of life and property. In order to reduce the losses, geological disaster monitoring methods with various tools and techniques have been widely applied to various fields and have made a significant effect. Landslides and ground subsidence caused by local rock and mass deformation is an important disaster precursory phenomena in monitoring the field. If the position and size of rock and mass deformation can be located before a disaster occurs, disaster prevention, disaster preparedness and effective can be promoted to reduce losses caused by disasters. Currently, time domain reflectometry (TDR) sensing cables are mainly coaxial cables or parallel lines. Due to the limited amount of elongation of present TDR sensing cables and the ease of breaking off under tension, existing TDR sensing cables are not suitable for large distributed measurement like rock and soil deformation. Therefore, there is a need for a new TDR sensing cable.

SUMMARY

In order to overcome the problem of the ease of breaking off under tension with existing TDR sensing cables, to the present disclosure provides a type of sensing cable with parallel spiral transmission line structure for distributed sensing and measuring of rock-soil mass deformation, which can be stretched longer.

An embodiment of the present disclosure is highlighted below.

A silicone strip with a circular cross section has a single layer of two parallel and mutually-insulated wires tightly wound thereon. These two wires form a pair of spiral wires. There is a silicone shroud wrapping and covering the two spiral wires. A matched impedance $Z_L$ is connected to one end of each of the spiral wires, and a TDR measurement instrument is connected to the other end of each of the spiral wires.

The two mutually-insulated wires may be made of a single-strand copper wire, multi-strand copper wires or a single-strand aluminum wire.

When the sensing cable is buried under or constructed along the body of rock and soil being monitored, it may be stretched longer when rock and soil deformation occurs. Because of the elastic silicone strip and the spiral structure, during the process of being stretched, a helix pitch of the spiral wires is allowed to increase over a relatively large range without resulting in the sensing cable being broken. Because the helix pitch is increased, the characteristic impedance of the deformed cables is changed over the deformed portion. The local change in the characteristic impedance leads to a change of a TDR waveform which may be recorded by the TDR measurement instrument. With the changed TDR waveform, the position of the deformation may be located and the size of the deformation may be measured.

The present disclosure implements a distributed positioning and measuring of rock and soil deformation. It solves the dilemma of "measuring the unchanged while the changed is not measured" with respect to landslides, ground subsidence and other geotechnical deformation monitoring. The proposed technique provides good tool for distributed deformation measurement.

In the Figures: 1) silicone strip; 2) mutually-insulated wires; 3) silicone shroud; 4) TDR measurement instrument; 5) incident signal; 6) reflected signal; 7) sensing cable.

DETAILED DESCRIPTION OF PREFERRED EMBODIMENTS

The present disclosure will be further described with accompanying drawings and instances.

As shown in FIG. 1, FIG. 2, FIG. 3 and FIG. 4, the present disclosure provides a circular cross-section silicone strip 1 that is tightly wounded by a single layer of two mutually-insulated wires 2. The two mutually-insulated wires 2 are spirally-wound wires. A silicone shroud wraps and covers the spiral wires to form a sensing cable 7. A matched impedance $Z_L$ is connected to one end of each of the two mutually-insulated wires. A TDR measurement instrument 4 is connected to the other end of each of the two mutually-insulated wires.

An electrically-insulated scarfskin of the straight parallel wires is connected together so that the distance between the wires remains unchanged. Initially the wires tightly wind around the surface of the circular cross-section of the silicone strip. Such structural characteristic allows the sensing cable to have a relatively large elongation under stretch. The change of the helix pitch of the spirally-wound wires causes impedance changes when the sensing cable is stretched.

Principle of the Sensing Cable

Figure 1:
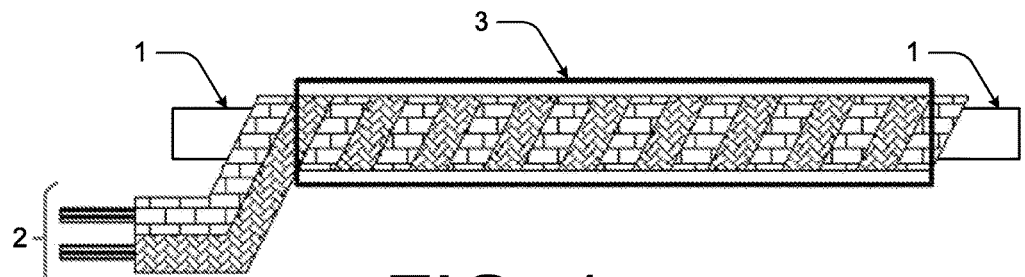
FIG. 1 is a schematic diagram of the structure of the present disclosure.
Figure 2:
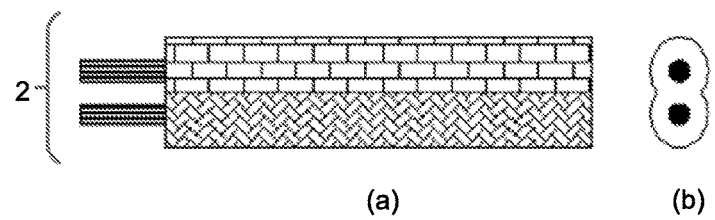
FIG. 2 is an example structure of two parallel straight wires.
Figure 3:
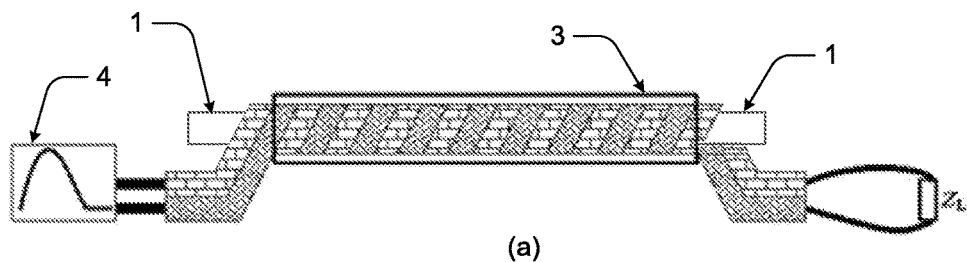
FIG. 3 is a structural change in distributed deformation measurements before and after the local cable tension.

FIG. 3 shows the structure changes of sensing cable before and after stretch. FIG. 3(a) is the sensing cable before stretch. FIG. 3(b) is the sensing cable with local elongation under stretch. As can be seen in FIG. 3, when the sensing cable is locally stretched, the number of windings by the wires is fixed and the length of the sensing cable is increased. Thus, the thread pitch of stretched part of the sensing cable and the local characteristic impedance are increased.

Figure 4:
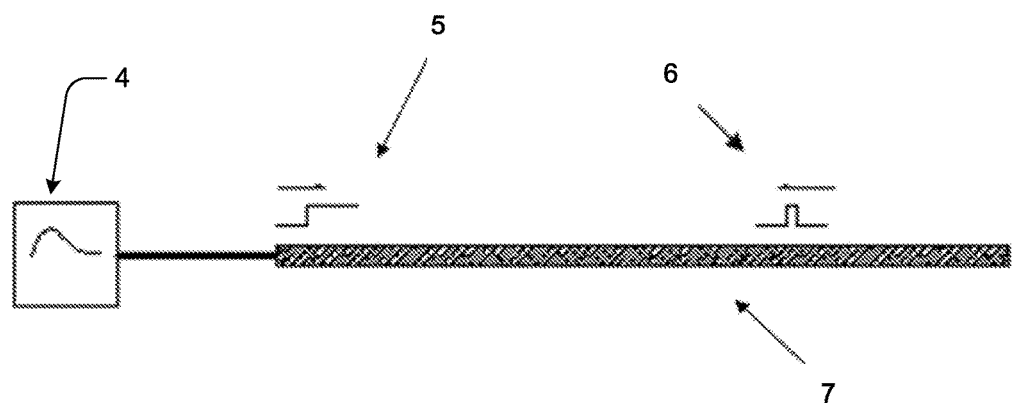
FIG. 4 is an example sensing method of the present disclosure.
Figure 5:
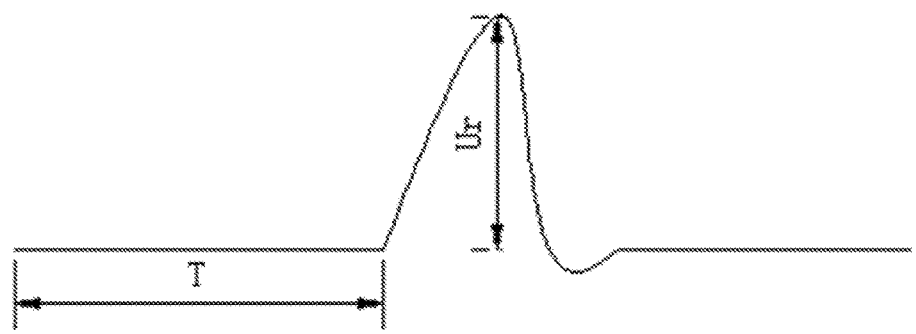
FIG. 5 is an example TDR waveform.

FIG. 4 depicts a measuring method is showed in FIG. 4. Numeral reference 5 indicates an incident signal and numeral reference 6 indicates a reflected signal. One end of the sensing cable is connected to TDR measurement instrument 4. According to the principle of the transmission line, when TDR instrument sends a step signal or a pulse signal from the end of the cable, the reflected voltage $U_t$ and the input voltage $U_r$ have the following relationship $$U_r = \frac{Z_d - Z_c}{Z_d + Z_c} * U_t$$

where $Z_c$ is the initial characteristic impedance of the cable, $Z_d$ is the characteristic impedance of the stretch section. Initially $Z_c = Z_d$ and reflected voltage $U_r = 0$. When the cable is locally stretched, $Z_d$ increases and TDR waveform produces a reflected voltage $U_r$ greater than zero. The TDR measurement instrument records the reflected voltage waveform as shown in FIG. 5.

According to time difference T between the reflected voltage $U_t$ and the incident voltage $U_r$, and spread speed v, the distance S between the cable terminal and stretch point can be calculated as shown below.

$$S = \frac{1}{2} * T * v$$

If the cable is buried in rock or soil, the deformation of rock or soil will cause local stretch in the sensing cable. According to the time T and the reflected voltage $U_r$, deformation ΔL and deformation position S can be measured.

What is claimed is:

1. A sensing cable of a parallel spiral transmission line structure for distributed sensing and measuring of rock-soil mass deformation, comprising:
   a strip comprising a first elastic material;
   a spiral structure wrapping around the strip, the spiral structure comprising a single layer of two mutually-insulated wires running in parallel; and
   a shroud comprising a second elastic material, the shroud wrapping and covering the spiral structure,
   wherein the two mutually-insulated wires comprise a first wire and a second wire disposed side-by-side and next to one another, the first and second wires held together by an electrically insulating scarfskin such that a distance between the first and second wires remains substantially unchanged,
   wherein a matched impedance is connected between a first end of the first wire of the two mutually-insulated wires and a first end of the second wire of the two mutually-insulated wires,
   wherein a time domain reflection measurement instrument is connected between a second end of the first wire of the two mutually-insulated wires and a second end of the second wire of the two mutually-insulated wires, and
   wherein a helix pitch of the spiral structure is configured to change in response to the rock-soil deformation.

2. The sensing cable of claim 1, wherein each of the first wire and the second wire of the two mutually-insulated wires comprises a single-strand copper wire, a multi-strand copper wire, or a single-strand aluminum wire.

3. The sensing cable of claim 1, wherein the first elastic material comprises silicone.

4. The sensing cable of claim 1, wherein the second elastic material comprises silicone.

5. The sensing cable of claim 1, wherein the strip has a circular cross section.

6. The sensing cable of claim 1, wherein the change of the helix pitch of the spiral structure is configured to cause a corresponding change in a characteristic impedance of the spiral structure.

7. A sensing cable of a parallel spiral transmission line structure for distributed sensing and measuring of rock-soil mass deformation, comprising:
   a strip comprising a first elastic material;
   a spiral structure wrapping around the strip, the spiral structure comprising two mutually-insulated wires running in parallel; and
   a shroud comprising a second elastic material, the shroud wrapping and covering the spiral structure,
   wherein the two mutually-insulated wires comprise a first wire having a first thickness and a second wire having a second thickness, each of the first and second wires contacting a same surface of the strip,
   wherein the spiral structure has a helix pitch substantially equal to a sum of the first and second thicknesses,
   wherein a matched impedance is connected between a first end of the first wire of the two mutually-insulated wires and a first end of the second wire of the two mutually-insulated wires,
   wherein a time domain reflection measurement instrument is connected between a second end of the first wire of the two mutually-insulated wires and a second end of the second wire of the two mutually-insulated wires, and
   wherein the helix pitch of the spiral structure is configured to change in response to the rock-soil deformation.

8. The sensing cable of claim 7, wherein each of the first wire and the second wire of the two mutually-insulated wires comprises a single-strand copper wire, a multi-strand copper wire, or a single-strand aluminum wire.

9. The sensing cable of claim 7, wherein the first elastic material comprises silicone.

10. The sensing cable of claim 7, wherein the second elastic material comprises silicone.

11. The sensing cable of claim 7, wherein the strip has a circular cross section.

12. The sensing cable of claim 7, wherein the change of the helix pitch of the spiral structure is configured to cause a corresponding change in a characteristic impedance of the spiral structure.

13. The sensing cable of claim 7, wherein each of the first wire and the second wire comprises a single-strand copper wire, a multi-strand copper wire, or a single-strand aluminum wire.

14. The sensing cable of claim 7, wherein the first elastic material comprises silicone.

15. The sensing cable of claim 7, wherein the second elastic material comprises silicone.

16. The sensing cable of claim 7, wherein the change of the helix pitch of the spiral structure is configured to cause a corresponding change in a characteristic impedance of the spiral structure.

17. A sensing cable of a parallel spiral transmission line structure for distributed sensing and measuring of rock-soil mass deformation, comprising:

a strip comprising a first elastic material and having a circular cross section;

a spiral structure wrapping around the strip, the spiral structure comprising two wires running in parallel, the two wires held together by an electrically insulating scarfskin such that the two wires are mutually insulated from one another and that a distance between the two wires remains substantially unchanged; and a shroud comprising a second elastic material, the shroud wrapping and covering the spiral structure, wherein the two wires comprise a first wire and a second wire each wrapping around the strip with a same radius, wherein a matched impedance is connected between a first end of the first wire of and a first end of the second wire, wherein a time domain reflection measurement instrument is connected between a second end of the first wire and a second end of the second wire, and wherein a helix pitch of the spiral structure is configured to change in response to the rock-soil deformation.

* * * * *